(12) United States Patent
Hoskins et al.

(10) Patent No.: US 10,946,857 B2
(45) Date of Patent: Mar. 16, 2021

(54) GEOTAGGED AND TIME STAMPED DATA SECURED BY DIGITAL SIGNATURE SHARED ON PRIVATE NETWORK

(71) Applicant: Kostal of America, Troy, MI (US)

(72) Inventors: Steven R. Hoskins, Walled Lake, MI (US); Paul Kissel, Waterford, MI (US)

(73) Assignee: Kostal of America, Inc., Troy, MI (US)

( * ) Notice: Subject to any disclaimer, the term of this patent is extended or adjusted under 35 U.S.C. 154(b) by 483 days.

(21) Appl. No.: 15/727,054

(22) Filed: Oct. 6, 2017

(65) Prior Publication Data

US 2019/0106100 A1    Apr. 11, 2019

(51) Int. Cl.
*B60W 30/09* (2012.01)
*H04W 4/70* (2018.01)
*B60W 30/095* (2012.01)
*H04W 4/18* (2009.01)

(52) U.S. Cl.
CPC ........ *B60W 30/09* (2013.01); *B60W 30/0956* (2013.01); *H04W 4/70* (2018.02); *H04W 4/185* (2013.01)

(58) Field of Classification Search
CPC ............. B60W 30/09; B60W 30/0956; B60W 2050/008; B60W 2050/0005; B60W 50/00; H04W 4/70; H04W 4/185; H04W 4/029; H04W 12/02; H04W 4/80; H04W 4/46
See application file for complete search history.

(56) References Cited

U.S. PATENT DOCUMENTS

| | | |
|---|---|---|
| 8,125,377 B2 | 2/2012 | Harper et al. |
| 8,594,706 B1 | 11/2013 | Heinen |
| 8,769,267 B2 | 7/2014 | Gutt et al. |
| 8,775,816 B2 | 7/2014 | Lopez et al. |
| 8,935,241 B2 | 1/2015 | Chmiel et al. |
| 9,222,781 B2 | 12/2015 | Schenken et al. |
| 9,373,149 B2 | 6/2016 | Abhyanker |
| 2012/0268244 A1* | 10/2012 | Ljung ............ H04L 67/18 340/5.65 |
| 2014/0067801 A1 | 3/2014 | Marvit et al. |
| 2015/0095355 A1 | 4/2015 | Patton |
| 2015/0134851 A1 | 5/2015 | Relan et al. |
| 2015/0154417 A1 | 6/2015 | Pasumarthi et al. |

(Continued)

FOREIGN PATENT DOCUMENTS

EP        3095048 A1    4/2017

*Primary Examiner* — Mary Cheung
(74) *Attorney, Agent, or Firm* — Gunther J. Evanina; Butzel Long, PC

(57) ABSTRACT

An autonomous vehicle and method for vehicle-to-vehicle communication is disclosed. The vehicle has a computer system capable of creating anonymous geotagged data and transmitting and receiving the geotagged data through a secured network for storage on a private cloud. The vehicle is equipped with a navigation system in communication with said computer and at least one sensor in communication with said computer system. The sensors are capable of creating data signals indicative of at least one of vehicle telemetry, travel visibility, and road conditions. The system includes a timer in communication with the computer system capable of creating a time stamp. The geotagged data can be used to control an automatic brake system and/or an autonomous driving system.

4 Claims, 7 Drawing Sheets

(56) References Cited

U.S. PATENT DOCUMENTS

2016/0203651 A1* 7/2016 Heath .................... G06Q 50/30
                                                        705/13
2016/0307285 A1   10/2016 Gallagher
2018/0067966 A1*  3/2018 Oder .................. G06K 9/00791

* cited by examiner

GEOTAGGED AND TIME STAMPED DATA SECURED BY DIGITAL SIGNATURE SHARED ON PRIVATE NETWORK

FIELD OF THE DISCLOSURE

This disclosure relates to peer-to-peer or vehicle-to-vehicle communications over a secure network, and more specifically to communication of geotagged and time-stamped data over a private wireless network.

BACKGROUND OF THE DISCLOSURE

Autonomous vehicles are the next generation of mobility and will feature advanced safety over existing vehicles. As part of the safety features for these new vehicles, each vehicle may have peer-to-peer communication so that road conditions, visibility and other features of the travel may be shared between vehicles traveling opposite each other on the same road, or in the same direction on the same road, but separated by a distance. It is advantageous for each vehicle to be apprised of road conditions so that safety may be enhanced, or alternative routes taken. There is a continuing need for an autonomous vehicle with improved peer-to-peer communication system for transmitting and receiving secure geotagged and time stamped data over a secure network indicative of at least vehicle global position location, road conditions, travel visibility and vehicle telemetry.

SUMMARY OF THE DISCLOSURE

In certain aspects of this disclosure, there is provided a vehicular peer-to-peer or vehicle-to-vehicle communication system over a secure wireless network. The system facilitators gathering of vehicle telemetry, travel visibility and/or road condition data that is geotagged, time-stamped and communicated to a private cloud over the wireless network. This geotagged and time-stamped data can be collected from a plurality of vehicles and can be shared among the plurality of vehicles. The data can be displayed to drivers or used by an automatic brake system or an autonomous driving system to appropriately control the vehicle.

In certain other aspects of this disclosure, there is provided a method of controlling an autonomous vehicle using the vehicular peer-to-peer communication system.

DETAILED DESCRIPTION

Figure 1:
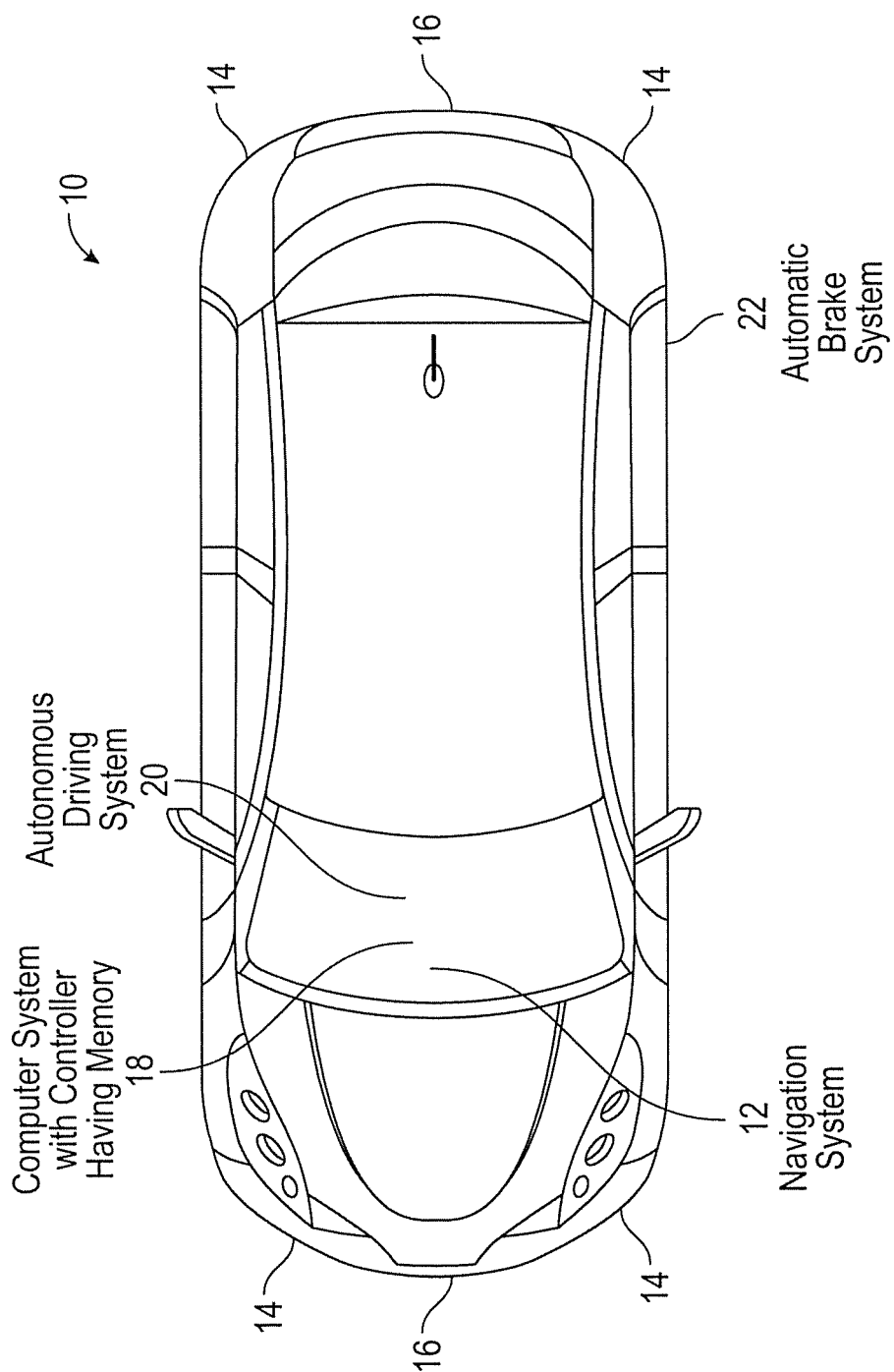
FIG. 1 is a representation of a vehicle equipped with a navigation system, cameras, sensors to detect road conditions and cell phone or Wi-Fi capabilities.

Turning now to the drawings, wherein like numbers refer to like features, FIG. 1 shows a vehicle 10 having a navigation system 12, sensors 14 capable of transmitting signal indicative of road conditions and vehicle telemetry, a camera 16 mounted on the vehicle (optionally both front and rear) for transmitting visibility conditions, and an onboard computer 18 that optionally controls an autonomous driving system 20. Vehicle 10 may also include an automatic brake system 22. The onboard computer or "controller" has memory that may be FLASH, RAM, ROM, PROM, EPROM, EEPROM or any other memory within which to store information and instructions.

Having described a suitable autonomous vehicle, the disclosure also includes at least one method for peer-to-peer, or vehicle-to-vehicle communication over a secure network so that vehicles separated by distance may communicate with each other. Such vehicles may be traveling in the same or opposite direction.

Figure 2:
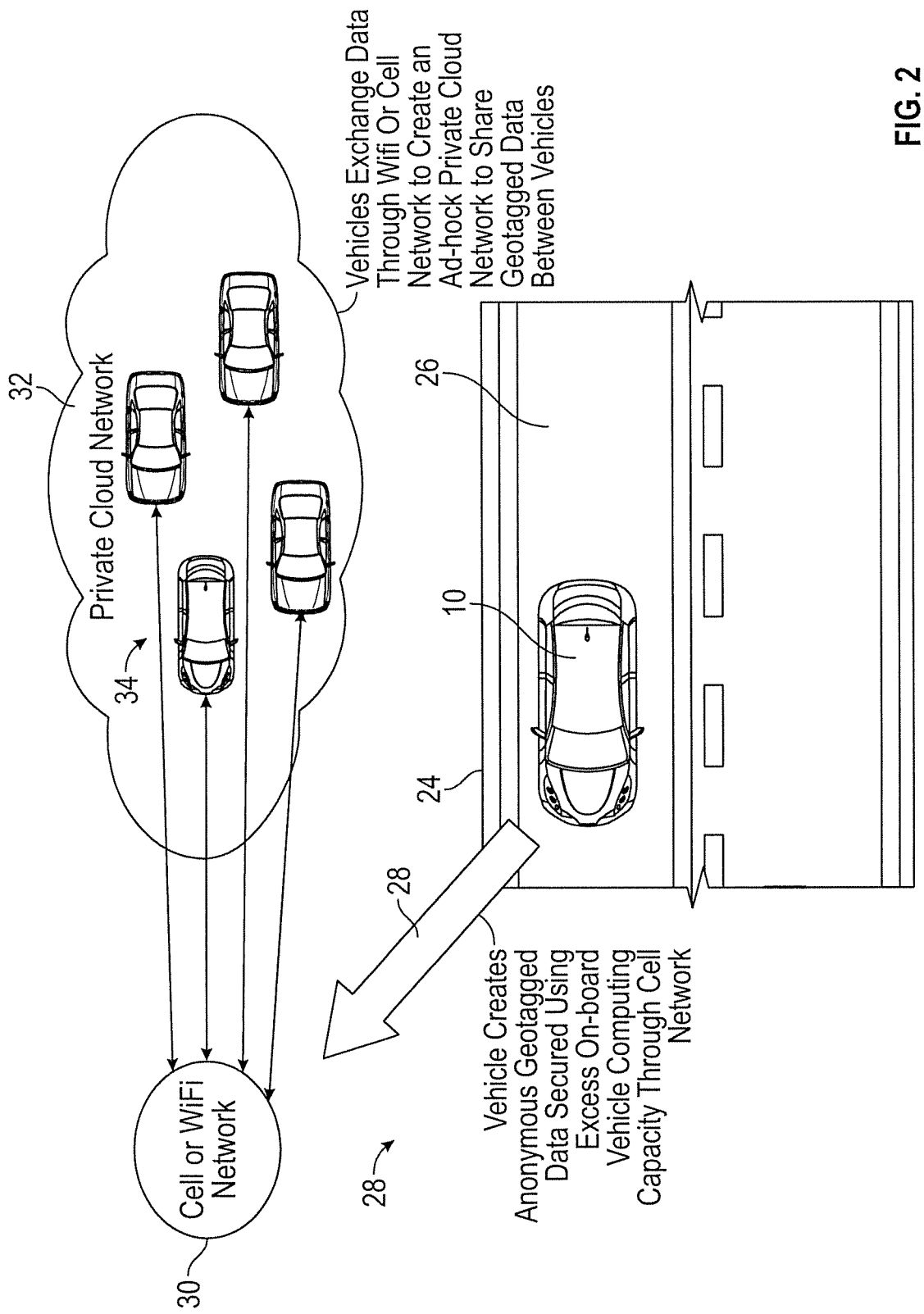
FIG. 2 is a representation of a vehicle on a section of road transmitting data over a cell network to a private cloud.

Turning now to FIG. 2, there is shown a vehicle 10 on a section of road 26 transmitting data 28 over a cell network 30 to a private cloud 32. The vehicle may be an autonomous vehicle as previously described, or it could be a vehicle without an autonomous driving system. The vehicle computer creates anonymous geotagged data 28 which is secured using a wireless network, such as a Wi-Fi or a cell phone network. The cell phone network transmits the anonymous geotagged data to a private cloud network 32. The transmitted data is stored in the private cloud to be accessed by subscribers or others with access to the private cloud.

Figure 3:
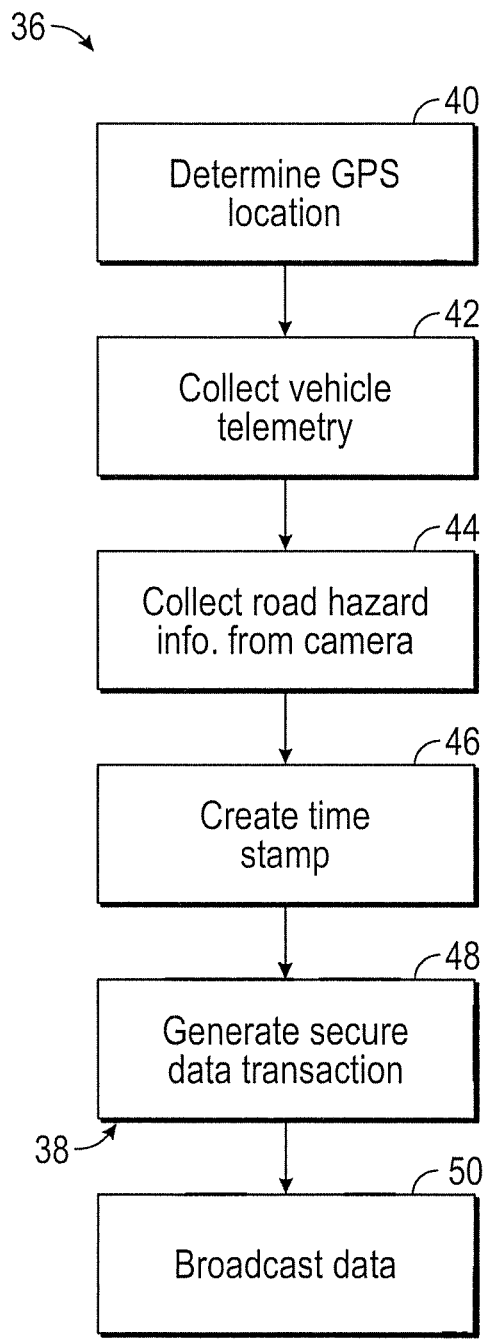
FIG. 3 is a representation of a flowchart showing a method for generating secure geotagged data according to one embodiment.
Figure 4:
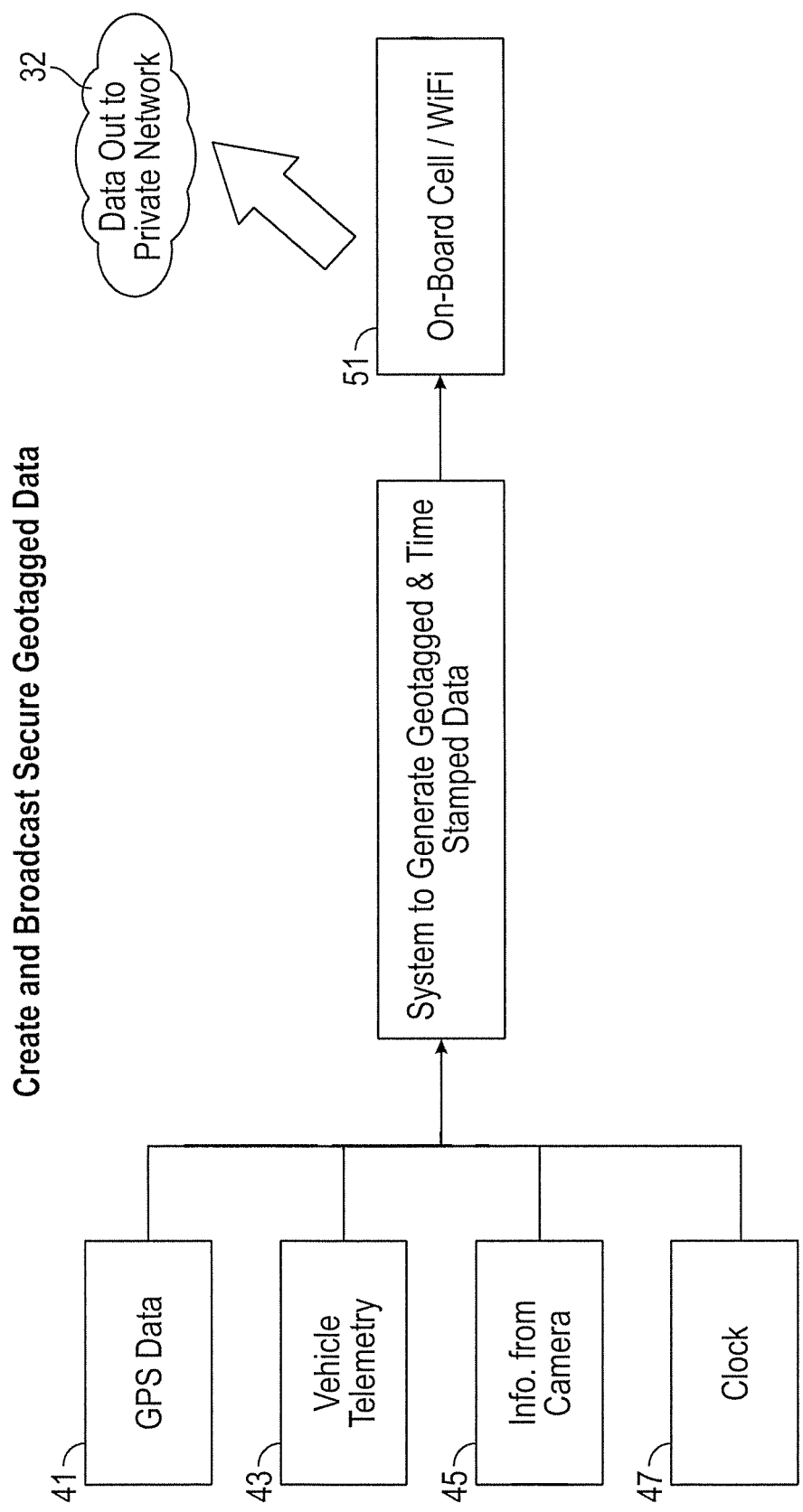
FIG. 4 is a representation of a flowchart showing the broadcast of secure geotagged data according to one embodiment.

Turning now to FIG. 3, there is shown a representation of a flowchart showing one method 36 to create secure geotagged data 38 according to one embodiment. The navigation system determines the global position location 40 of the vehicle. The computer system collects vehicle telemetry 42 and the sensors, such as a camera, collect road conditions 44, such as hazards, traffic slow-downs or stops, etc. The computer has a clock that creates a time stamp 46 at each interval of data collection in real time. The computer generates a secure data transaction 48, and then broadcasts the geotagged data at 50 over a cell network or Wi-Fi. Turning to FIG. 4, the secure geotagged data includes the GPS data 41, vehicle telemetry 43, information from the sensors and camera 45 as well as a clock function 47 to time stamp the data which is transmitted via cell phone (optionally onboard cell phone) or Wi-Fi 51 to the private network.

Figure 5:
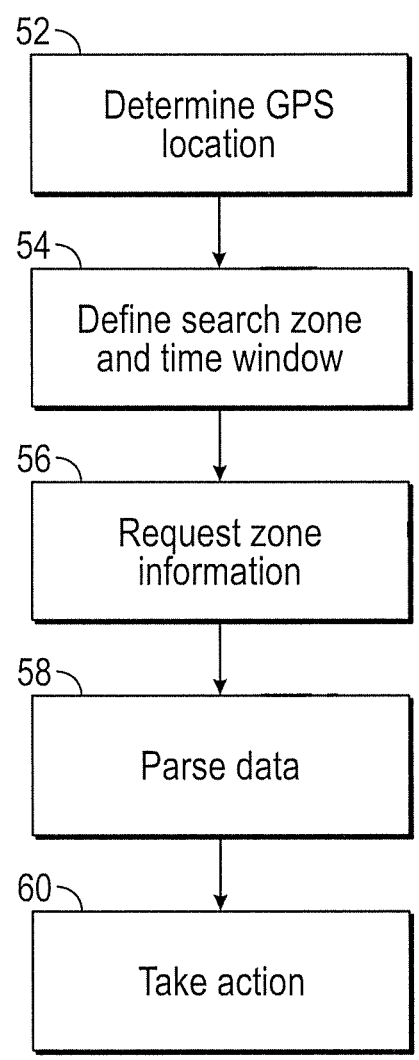
FIG. 5 is a representation of a flowchart showing a method for reading secure geotagged data according to one embodiment.
Figure 6:
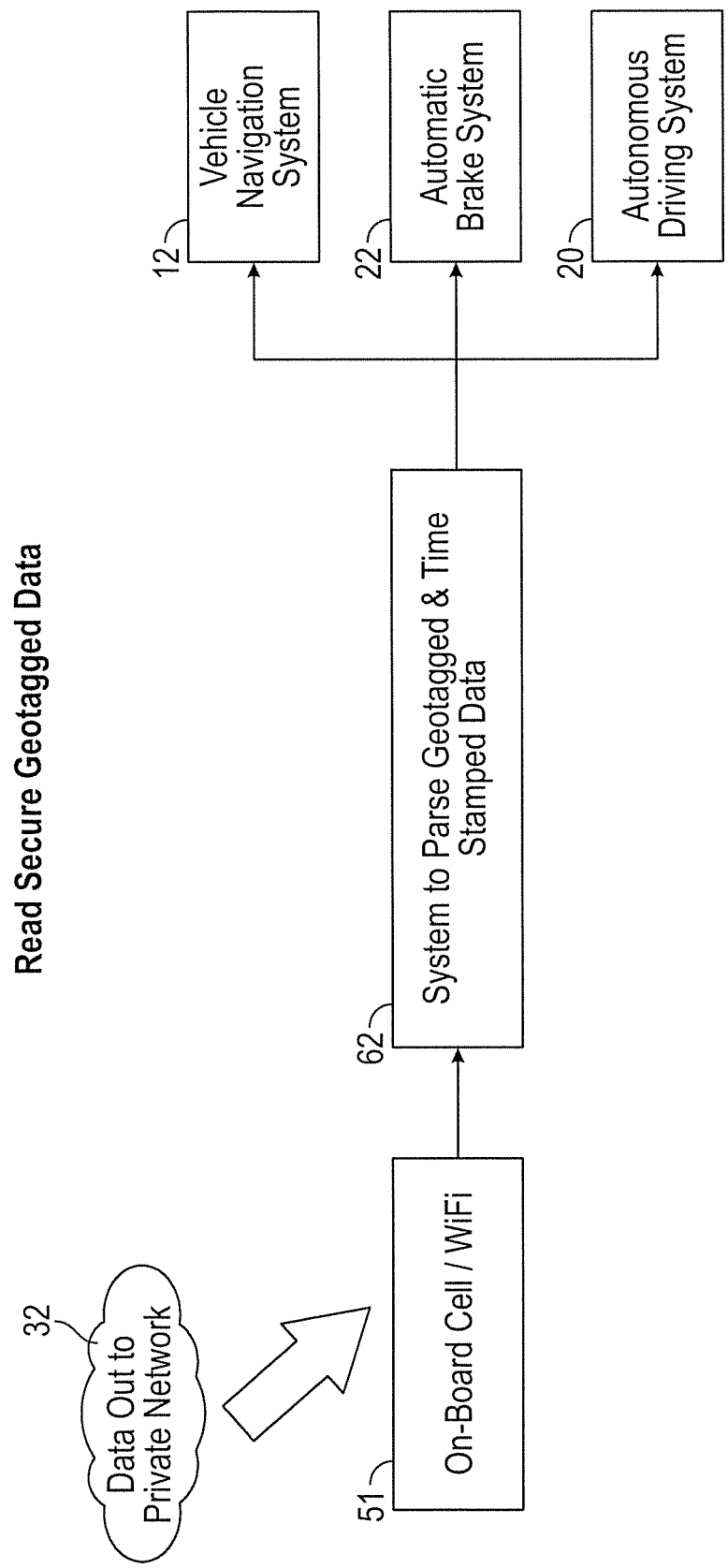
FIG. 6 is a representation of a flowchart showing the receipt of secure geotagged data according to one embodiment.

As illustrated in FIG. 5, a vehicle using the data stored in the private cloud first determines the GPS location of itself and the transmitting vehicle at 52. The receiving vehicle will define a search zone and time window 54 and then request zone information 56. Received data is parsed at 58, and the computer then takes action 60 depending upon the data received. As seen in FIG. 6, the requested data is transmitted out of the private network to an onboard cell or Wi-Fi receiver. The computer system parses the geotagged and time stamped data at 62, which can be shared with the vehicle navigation system, the automatic brake system and the autonomous driving system. Each of these systems can use the data received to alter or manage the vehicle operation based upon the data received.

Figure 7:
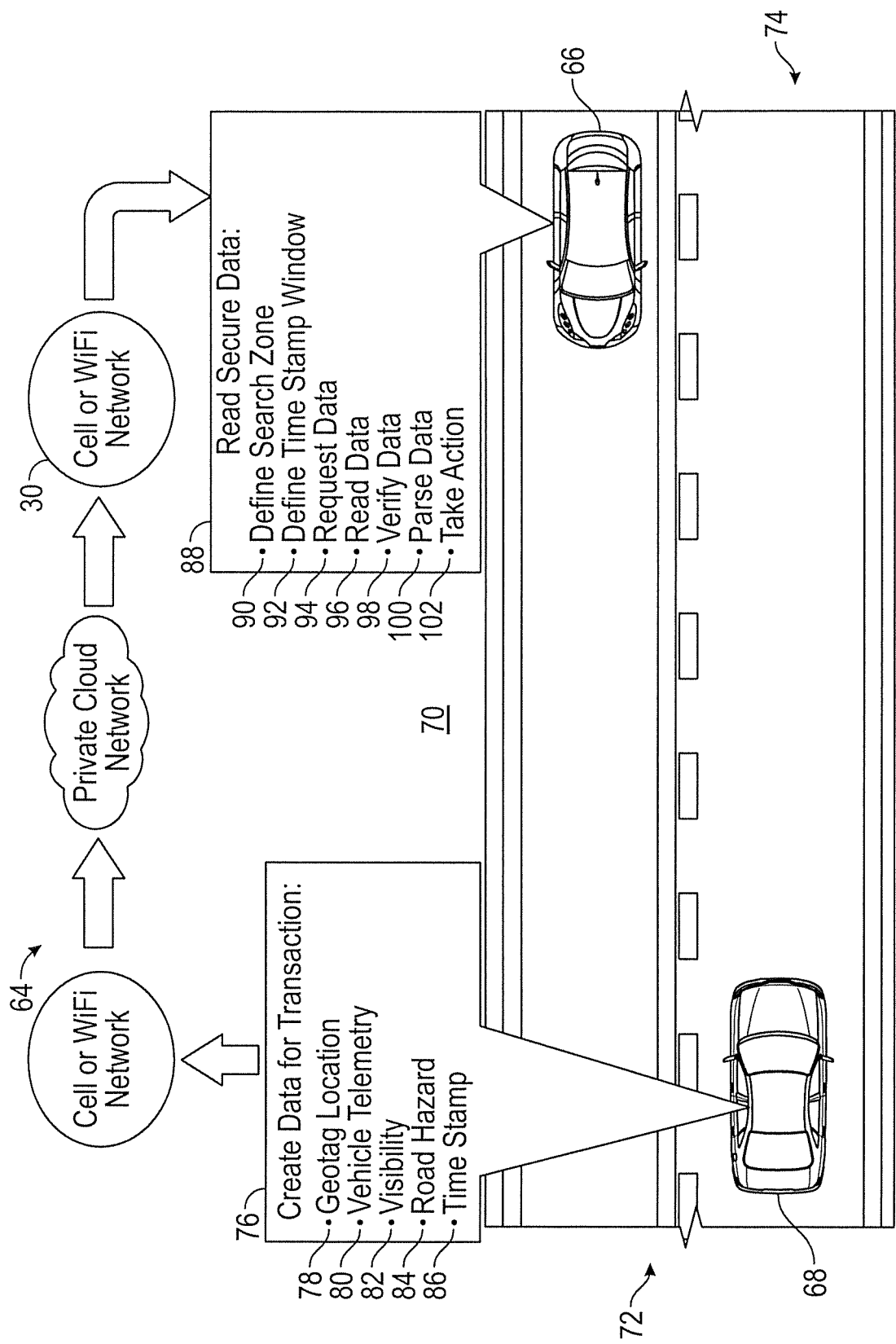
FIG. 7 is a representation of two vehicles on a section of road wherein one vehicle transmits data and another vehicle receives data.

Turning now to FIG. 7, a peer-to-peer, or vehicle-to-vehicle communication system 64 will be described according to one, non-limiting embodiment. Vehicle 66 and 68 are shown on road 70 traveling toward each other in their respective lanes 72 and 74. In this depiction, vehicle 68 creates "transaction data" 76, which may include its geotag location 78, vehicle telemetry 80, visibility conditions 82, road hazard encountered or sensed 84 and a time stamp 86 for each of the transmitted data. This transaction data 76 is transmitted via a cell network. The receiving vehicle 66 will define the search zone 90, define the time stamp window it has received 92, request data 94, read the data 96, verify the data 98 to ensure it is from a vehicle that is authorized to communicate via the private network, parse the data 100 for use by the vehicle systems, and then the computer can take action 102 based upon the data received, such as to control or modify the operation of vehicle 66 by engaging the autonomous drive, or activating the automatic brake system as it proceeds along its travel path.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

What is claimed is:

1. A vehicular peer-to-peer communication system over a secure network, comprising:
    a plurality of vehicles;
    each of said plurality of vehicles having at least one onboard sensor capable of creating data indicative of at least one of travel visibility and road conditions;
    a navigation system for determining global position location of the vehicle at the time the data is created;
    a timer for creating a time stamp at the time the data is created; and
    a computer associating the created data with the global position location and time stamp, and making the geo-tagged, time-stamped data available to the plurality of vehicles through a secured network.

2. The system of claim 1, wherein said secure network is a cell phone network or Wi-Fi network.

3. The system of claim 1, wherein said sensor to collect road conditions is a camera.

4. The system of claim 1, wherein data received by said vehicle is parsed, time stamped and communicated to said navigation system, automatic brake system and autonomous driving system.

* * * * *